United States Patent [19]

Mueller

[11] Patent Number: 4,952,451

[45] Date of Patent: Aug. 28, 1990

[54] STRETCH/SHRINK FILM WITH IMPROVED OXYGEN TRANSMISSION

[75] Inventor: Walter B. Mueller, Inman, S.C.

[73] Assignee: W. R. Grace & Co.-Conn., Duncan, S.C.

[21] Appl. No.: 273,385

[22] Filed: Nov. 17, 1988

[51] Int. Cl.⁵ ...................... B32B 27/08; D03D 35/00
[52] U.S. Cl. .................... 428/218; 428/516; 428/520; 428/910; 428/522; 428/331; 428/447; 264/22; 264/209.1
[58] Field of Search ............... 428/516, 520, 910, 218

[56] References Cited

U.S. PATENT DOCUMENTS 4,178,401 12/1979 Weinberg et al. .................. 428/520
4,279,957 7/1981 Hiraoka et al. .................... 428/910

Primary Examiner—P. C. Ives
Attorney, Agent, or Firm—John J. Toney; William D. Lee, Jr.; Mark B. Quatt

[57] ABSTRACT

A multi-layered thermoplastic polyolefin film having an improved combination of physical characteristics is disclosed. In particular, the multi-layered film evidences an improved combination of elongation, oxygen transmission and heat shrinkability. Preferred five layer embodiments of the film comprises (1) a core layer of either a low density polyethylene homopolymer or an ethylene acetate copolymer or a blend of an ethylene vinyl acetate copolymer with a linear low density polyethylene; (2) two adjacent intermediate layers of a very low density polyethylene with a density of less than 0.900 gms/ccm, and (3) two surface layers of an ethylene vinyl acetate copolymer.

13 Claims, 1 Drawing Sheet

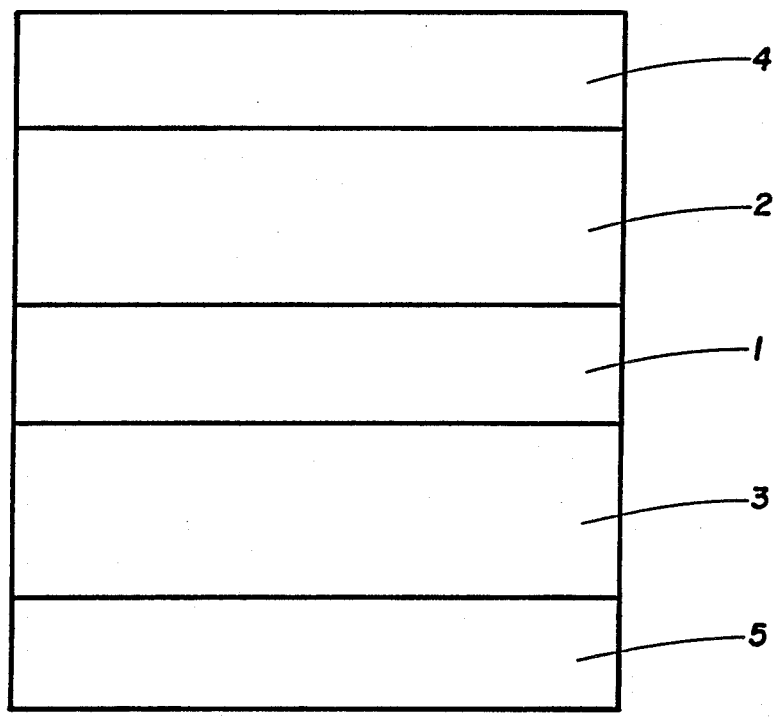
FIGURE I

STRETCH/SHRINK FILM WITH IMPROVED OXYGEN TRANSMISSION

FIELD OF THE INVENTION

The present invention relates to a heat shrinkable, thermoplastic packaging film. In particular, the invention is directed to multilayer stretch/shrink films comprising an interior layer of a low density polyethylene homopolymer or an ethylene vinyl acetate copolymer, at least one other interior layer of a very low density polyethylene having a density of less than 0.900 grams per cubic centimeter, and two surface layers comprising an ethylene vinyl acetate copolymer whereby certain desired combinations of physical characteristics beneficially result.

BACKGROUND OF THE INVENTION

The present invention is directed to new and useful multilayer heat shrinkable film formulations. One distinguishing feature of a shrink film is the film's ability, upon exposure to a certain temperature, to shrink or, if restrained from shrinking, to generate shrink tension within the film The manufacture of shrink films, as is well known in the art, may be generally accomplished by extrusion (single layer films) or coextrusion (multilayer films) of thermoplastic resinous materials which have been heated to their flow or melting point from an extrusion or coextrusion die in, for example, either tubular or planar (sheet) form. After a post extrusion quenching to cool by, for example, the well-known cascading water method, the relatively thick "tape" extrudate is then reheated to a temperature within its orientation temperature range and stretched to orient or align the crystallites and/or molecules of the material. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range it is easy to effectively orient the material.

The terms "orientation" or "oriented" are used herein to generally describe the process step and resultant product characteristics obtained by stretching and immediately cooling a resinous thermoplastic polymeric material which has been heated to a temperature within its orientation temperature range so as to revise the inter-molecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction uniaxial orientation results. When the stretching force is simultaneously applied in two directions biaxial orientation results. The term oriented is also herein used interchangeably with the term "heat shrinkable" with these terms designating a material which has been stretched and set by cooling while substantially retaining its stretched dimensions. An oriented (i.e. heat shrinkable) material will tend to return to its original unstretched (unextended) dimensions when heated to an appropriate elevated temperature.

Returning to the basic process for manufacturing the film as discussed above, it can be seen that the film, once extruded (or coextruded if it is a multilayer film) and initially cooled to by, for example, cascading water quenching, is then reheated to within its orientation temperature range and oriented by stretching. The stretching to orient may be accomplished in many ways such as, for example, by "blown bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly quenched while substantially retaining its stretched dimensions to rapidly cool the film and thus set or lock-in the oriented molecular configuration.

Of course, if a film having little or no orientation is desired, e.g. non-oriented or non-heat shrinkable film, the film may be formed from a non-orientable material or, if formed from an orientable material may be "hot blown". In forming a hot blown film the film is not cooled immediately after extrusion or coextrusion but rather is first stretched shortly after extrusion while the film is still at an elevated temperature above the orientation temperature range of the material. Thereafter, the film is cooled, by well-known methods. Those of skill in the art are well familiar with this process and the fact that the resulting film has substantially unoriented characteristics. Other methods for forming unoriented films are well known. Exemplary, is the method of cast extrusion or cast coextrusion which, likewise, is well known to those in the art.

After setting the stretch-oriented molecular configuration the film may then be stored in rolls and utilized to tightly package a wide variety of items. In this regard, the product to be packaged may first be enclosed in the heat shrinkable material by heat sealing the shrink film to itself where necessary and appropriate to form a pouch or bag and then inserting the product therein. If the material was manufactured by "blown bubble" techniques the material may still be in tubular form or it may have been slit and opened up to form a sheet of film material. Alternatively, a sheet of the material may be utilized to over-wrap the product. These packaging methods are all well known to those of skill in the art. Thereafter, the enclosed product may be subjected to elevated temperatures by, for example, passing the enclosed product through a hot air or hot water tunnel. This causes the enclosing film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable to first slit the tubular film to form a film sheet and thereafter form the sheet into bags or pouches. Such bag or pouch forming methods, likewise, are well known to those of skill in the art.

The above general outline for manufacturing of films is not meant to be all inclusive since such processes are well known to those in the art. For example, see U.S. Pat. Nos. 4,274,900; 4,229,241; 4,194,039; 4,188,443; 4,048,428; 3,821,182 and 3,022,543. The disclosures of these patents are generally representative of such processes.

Alternative methods of producing films of this type are known to those in the art. One well-known alternative is the method of forming a multilayer film by an extrusion coating rather than by an extrusion or coextrusion process as was discussed above. In extrusion coating a first tubular layer is extruded and thereafter an additional layer or layers is sequentially coated onto the outer surface of the first tubular layer or a successive layer. Exemplary of this method is U.S. Pat. No. 3,741,253. This patent is generally representative of an extrusion coating process.

Many other process variations for forming films are well known to those in the art. For example, multiple layers may be first coextruded with additional layers thereafter being extrusion coated thereon. Alternatively, two multilayer tubes may be coextruded with one of the tubes thereafter being extrusion coated or laminated onto the other. The extrusion coating method of film formation is preferable to coextruding the entire film when it is desired to subject one or more layers of the film to a treatment which may be harmful to one or more of the other layers. Exemplary of such a situation is a case where it is desired to irradiate one or more layers of a film containing an oxygen barrier layer comprised of one or more copolymers of vinylidene chloride and vinyl chloride. Those of skill in the art generally recognize that irradiation is generally harmful to such oxygen barrier layer compositions. Accordingly, by means of extrusion coating, one may first extrude or coextrude a first layer or layers, subject that layer or layers to irradiation and thereafter extrusion coat the oxygen barrier layer and, for that matter, other layers sequentially onto the outer surface of the extruded previously irradiated tube. This sequence allows for the irradiation cross-linking of the first layer or layers without subjecting the oxygen barrier layer to the harmful effects thereof.

Irradiation of an entire film or a layer or layers thereof may be desired so as to improve the film's resistance to abuse and/or puncture and other physical characteristics. It is generally well known in the art that irradiation of certain film materials results in the cross-linking of the polymeric molecular chains contained therein and that such action generally results in a material having improved abuse resistance. When irradiation is employed to accomplish the cross-linking, it may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

Cross-linking may also be accomplished chemically through utilization of peroxides as is well known to those of skill in the art. A general discussion of cross-linking can be found at pages 331 to 414 of volume 4 of the Encyclopedia of Polymer Science and Technology, Plastics, Resins, Rubbers, Figers published by John Wiley & Sons, Inc. and copyrighted in 1966. This document has a Library of Congress Catalog Card Number of 64-22188.

Another possible processing variation is the application of a fine mist of a silicone or anti-fog spray to the interior of the freshly extruded tubular material to improve the further processability of the tubular material.

The polyolefin family of shrink films and, in particular, the polyethylene family of shrink films provide a wide range of physical and performance characteristics such as, for example, shrink force (the amount of force that a film exerts per unit area of its cross-section during shrinkage), the degree of free shrink (the reduction in linear dimension in a specified direction that a material undergoes when subjected to elevated temperatures while unrestrained), tensile strength (the highest force that can be applied to a unit area of film before it begins to tear apart), heat sealability, shrink temperature curve (the relationship of shrink to temperature), tear initiation and tear resistance (the force at which a film will begin to tear and continue to tear), optics (gloss, haze and transparency of material), elongation (the degree the film will stretch or elongate at room temperature), elastic memory (the degree a film will return to its original unstretched (unelongated) dimension after having been elongated at room temperature), and dimensional stability (the ability of the film to retain its original dimensions under different types of storage conditions). Film characteristics play an important role in the selection of a particular film and they differ for each type of packaging application and for each type of package. Consideration must be given to the product size, weight, shape, rigidity, number of product components and other packaging materials which may be utilized along with the film material and the type of packaging equipment available.

In view of the many above-discussed physical characteristics which are associated with polyolefin films and films containing a polyolefin constituent and in further view of the numerous applications with which these films have already been associated and those to which they may be applied in the future, it is readily discernable that the need for ever improving any or all of the above described physical characteristics or combinations thereof in these films is great, and, naturally, ongoing. In particular, the quest for a heat shrinkable polyethyne film having an improved combination of elongation, elastic memory, puncture resistance, tear propagation resistance and heat sealability has been ongoing since such a film could compete well in the trayed product (for example, meat such as poultry parts) overwrap market. Historically, polyvinyl chloride (PVC) films have been utilized in this overwrap application because of their good degree of elongation and elastic memory. PVC was superior to conventional heat shrinkable films with regard to overwrapped trayed products which were subject to moisture loss because the PVC was elastic and continued to contract as the product lost moisture and shrank during the distribution cycle. The result was a tight package which was somewhat unattractive because it was leaky. The elasticity of PVC also allowed automatic overwrapping machinery to stretch the PVC material about the trayed product during overwrapping of the product and the associated tray. In spite of the fact that the package was leaky, PVC proved superior to conventional heat shrink packages because such conventional packaging materials possessed relatively poor elasticity or elastic memory. Thus, when a product wrapped in such a material shrank from moisture loss during the distribution cycle the film did not also shrink and the result was a loose package having a shopworn appearance.

Unfortunately, PVC has several drawbacks associated therewith which those in the art wish to improve upon or wholly eliminate. Exemplary of these drawbacks is the fact that PVC tray overwrap film generally evidences both (1) poor seal integrity and (2) poor abuse resistance.

The poor seal integrity of PVC overwrap films arises at least in part from the fact that the PVC material in PVC overwrapped trays is tack welded to itself as opposed to being hermetically sealed. Thus, the liquid purge or juices which exude from the overwrapped trayed meat products will leak through a tack sealed PVC overwrapped tray and result in a package that is unsightly and messy from a consumer viewpoint. This drawback appears to be irreconcilably linked to PVC since attempts to hermetically seal PVC in a commerial tray overwrap environment usually result in "burnthrough" of the PVC material.

Another major drawback of PVC tray overwrap material is, as stated above, the material's poor resistance to abuse. In this regard the PVC material tends to tear along the edges of the overwrapped tray if rubbed during transit by another tray or an enclosing carton.

U.S. Pat. No. 4,617,241 discloses a very useful stretch/shrink film with excellent elongation and heat shrinkability properties. In some applications, it is desirable to use such a film but with higher oxygen transmission properties. Certain vegetables and other food products, such as mushrooms, exhibit longer shelf life if a "breathable", i.e. high oxygen transmission rate film is employed as the packaging material.

OBJECT OF THE PRESENT INVENTION

Accordingly, it is a general object of the present invention to provide a tray overwrap polyolefin film that will be an improvement over the prior art traY overwrap films.

It is another object of the present invention to provide a polyolefin tray overwrap film having a desired new and improved combination of physical characteristics such as, for example, heat shrinkability, high oxygen transmission, and elongation.

Another object of the present invention is to provide a five layer polyolefin film having an interior core layer comprising either a low density polyethylene homopolymer or an ethylene vinyl acetate copolymer or a blend of an ethylene vinyl acetate copolymer with linear low density polyethylene; two adjacent intermediate layers comprising a very low density polyethylene having a density below 0.915 and preferably below 0.900 grams per cubic centimeter, and two surface layers comprising an ethylene vinyl acetate copolymer. interior layer of a low density polyethylene homopolymer or an ethylene vinyl acetate copolymer, at least one other interior layer of a very low density polyethylene having a density below 0.900 grams per cubic centimeter, and two surface layers comprising an ethylene vinyl acetate copolymer.

Still further objects and the broad scope of applicability of the present invention will become apparent to those of ordinary skill in the art from the details disclosed hereinafter. However, it should be understood that the following detailed description which indicates several preferred embodiments of the present invention is only given for purposes of illustration since various changes and modifications well within the scope of the present invention will become apparent to those of ordinary skill in the art in view of the following detailed description.

DEFINITIONS

Unless specifically set forth and defined or otherwise limited, the terms "polymer" or "polymer resin" as used herein generally include, but are not limited to, homopolymers, copolymers, such as, for example block, graft, random and alternating copolymers, terpolymers etc. and blends and modifications thereof. Furthermore, unless otherwise specifically limited the terms "polymer" or "polymer resin" shall include all possible symmetrical structures of the material. These structures include, but are not limited to, isotactic, syndiotactic and random symmetries.

The terms "melt flow" as used herein or "melt flow index" is the amount, in grams, of a thermoplastic resin which can be forced through a given orifice under a specified pressure and temperature within ten minutes. The value should be determined in accordance with ASTM D 1238.

The terms "barrier" or "barrier layer" as used herein means a layer of multilayer film which comprises a mterial which acts as a physical barrier to gaseous oxygen molecules. Typically the presence of a barrier layer within a film will reduce the oxygen permeability of the film to less than 70 c.c. per square meter, in 24 hours, at one atmosphere, 73° F. and 0% relative humidity. The value should be obtained in accordance with ASTM D 3985-81.

The terms "surface" or "surface layer" or "skin" or "skin layer" as used herein means a layer of a multilayer film which comprises a surface thereof.

The term "interior" or "interior layer" as used herein refers to a layer of a multilayer film which is not a skin or surface layer of the film.

The term "core" or "core layer" as used herein refers to an interior layer of a multilayer film having an odd number of layers wherein the same number of layers is present on either side of the core layer.

The term "intermediate" or "intermediate layer" as used herein refers to an interior layer of a multilayer film which is positioned between a core layer and a surface layer of said film.

The term "polyolefin" as used herein refers to polymers of relatively simple olefins such as, for example, ethylene, propylene, butenes, isoprenes and pentenes; including, but not limited to, homopolymers, copolymers, blends and modifications of such relatively simple olefins.

The term "polyethylene" as used herein refers to a family of resins obtained by polymerizing the gas ethylene, $C_2H_4$. By varying the catalysts and methods of polymerization, properties such as density, melt index, crystallinity, degree of branching and cross-linking, molecular weight and $C_2H_4$. By varying the catalysts and methods of polymerization, properties such as density, melt index, crystallinity, degree of branching and cross-linking, molecular weight and molecular weight distribution can regulated over wide ranges. Further modifications are obtained by copolymerization, chlorination, and compounding additives. Low molecular weight polymers of ethylene are fluids used as lubricants; medium weight polymers are waxes miscible with paraffin; and the high molecular weight polymers (generally over 6,000) are resins generally used in the plastics industry. Polyethylenes having densities ranging from about 0.900 g/cc to about 0.940 g/cc are called low density polyethylenes with those having densities from about 0.941 g/cc to about 0.965 g/cc and over are called high density polyethylenes. The low density types of polyethylenes are usually polymerized at high pressures and temperatures whereas the high density types are usually polymerized at relatively low temperatures and pressures.

The term "linear low density polyethylene" (LLDPE) as used herein refers to copolymers of ethylene with one or more comonomers selected from $C_4$ to $C_{10}$ alpha olefins such as butene-1, octene, etc. in which the molecules thereof comprise long chains with few side chain branches or crosslinked structures. The side branching which is present will be short as compared to non-linear polyethylenes. The molecular chains of a linear polymer may be intertwined, but the force tending to hold the molecules together are physical rather than chemical and thus may be weakened by energy applied in the form of heat. Linear low density polyethylene has a density usually in the range of from about 0.915 g/cc to about 0.940 g/cc and, preferably, the density should be maintained between 0.916 g/cc to 0.928 g/cc for film making purposes. The melt flow index of linear low density polyethylene generally ranges from between about 0.1 to about 10 grams per ten minutes and preferably between from about 0.5 to about 3.0 grams per ten minutes. Linear low density polyethylene resins of this type are commercially available and are manufactured in low pressure vapor phase and liquid phase processes using transition metal catalysts.

The term "very low density polyethylene" (VLDPE) generally refers to linear ethylene alpha-olefin copolymers having a density usually in a range of less than about 0.915 grams per cubic centimeter to about 0.890 grams per cubic centimeter. As used herein, VLDPE materials having particularly useful properties, especially high oxygen transmission characteristics, have a density of less than about 0.900 grams per cubic centimeter.

All compositional percentages used herein are calculated on a "by weight" basis.

Density should be measured in accordance with ASTM D 1505-68 (reapproved 1979).

Free shrink should be measured in accordance with ASTM D 2732.

Shrink tension and orientation release stress should be measured in accordance with ASTM D 2838-81.

The tensile properties of the film should be measured in accordance with ASTM D 882-81.

The elongation properties of the film should be measured in accordance with ASTM D 638.

The haze and luminous transmittance of the film should be measured in accordance with ASTM D 1003-61 (reapproved 1971).

The specular gloss of the film should be measured in accordance with ASTM D 2457-70 (reapproved 1977).

The tear propagation of the film should be measured in accordance with ASTM D 1938-67 (reapproved 1978).

The impact resistance of the film should be measured in accordance with ASTM D 3420-80.

A "cross-linked" material as used herein shall be defined as a material which after refluxing in boiling toluene or xylene, as appropriate, for forty (40) hours shall have a weight percent residue of at least 5 percent.

A rad is the quantity of ionizing radiation that results in the absorption of 100 ergs of energy per gram of a radiated material, regardless of the source of the radiation. A megarad is $10^6$ rads. (MR is an abbreviation for megarad.)

All of the above-identified ASTM standards are hereby incorporated by reference.

SUMMARY OF THE INVENTION

It has been discovered that a flexible, heat shrinkable thermoplastic packaging film having a desirable combination of physical characteristics such as, heat shrinkability, elongation, and oxygen transmission, tear resistance, elastic memory and heat shrinkability has been achieved by the multilayer flexible, thermoplastic packaging film of the present invention. This multilayer film comprises a first interior layer of either a low density polyethylene homopolymer, an ethylene vinyl acetate copolymer or a blend of an ethylene vinyl acetate copolymer with a linear low density polyethylene. The film also comprises at least one other interior layer comprising a very low density polyethylene having a density below 0.900 grams per cubic centimeter and two surface layers comprising an ethylene vinyl acetate copolymer. A preferred five layer embodiment has an interior core layer comprised of either a low density polyethylene homopolymer, an ethylene vinyl acetate copolymer or a blend of an ethylene vinyl acetate copolymer with a linear low density polyethylene. The preferred five layer film also comprises two intermediate layers each adjacent to the core layer and each comprising a very low density polyethylene having a density below 0.900 grams per cubic centimeter. Two surface layers comprising an ethylene vinyl acetate copolymer are also present. Preferably, the multilayer film is both oriented and irradiated. Preferable ranges of irradiation are from 4-8 MR. Preferably, the film has an oxygen transmission rate of at least about 15,000 cc/meters$^2$ mil 24 hours at standard temperature and pressure.

An even more preferred embodiment of the present invention encompasses a five layered film having a core layer consisting essentially of either a low density polyethylene homopolymer or an ethylene vinyl acetate copolymer or a blend of an ethylene vinyl acetate copolymer with a linear low density polyethylene. This film also has two intermediate layers adjacent to the core layer with each intermediate layer consisting essentially of a very low density polyethylene having a density of less than 0.900 grams per cubic centimeter. Two skin layers consisting essentially of a copolymer of ethylene and vinyl acetate are also present.

The multilayer film may be combined with other polymeric materials for specific applications. For instance, additional layers may be added on either or both sides of the film to improve various physical characteristics.

BRIEF DESCRIPTION OF THE DRAWING

FIG. 1 is a cross-sectional view of a preferred five layered embodiment of the present invention.

DESCRIPTION OF THE PREFERRED EMBODIMENT

Referring to FIG. 1, which is a cross-sectional view of a five layered preferred embodiment of the present invention, it is seen that this embodiment comprises a core layer 1, two adjacent intermediate layers 2 and 3 and two skin or surface layers 4 and 5. The preferred thickness ratio of the five layers of 1/1.5/1/1.5/1 is demonstrated in FIG. 1. Preferred core layer 1 formulations may comprise either (1) an ethylene vinyl acetate copolymer or (2) a blend of ethylene vinyl acetate copolymer with linear low density polyethylene or (3) a conventional highly branched low density polyethylene.

My experimentation has revealed an especially preferred core layer formulation is an ethylene vinyl acetate copolymer having approximately 9% vinyl acetate derived units in the copolymer. This material may be obtained from the Exxon Company under the trade designation LD 318.92. This resin is believed to have a density at 23° C. of about 0.930 gm/cm$^3$ and a flow rate (measured by condition E) of about 2.0 gm/10 min. Other ethylene vinyl acetate copolymers or blends of two or more ethylene vinyl acetate copolymers may be utilized to form the core layer 1. For example an ethylene vinyl acetate copolymer having about 3.6% vinyl acetate derived units may be utilized. Such a material may be obtained under the trade designation PE 204 from El Paso Polyolefins Company.

A preferred linear low density polyethylene may be obtained from the Dow Chemical Company under the trade designation Dowlex 2045. Dowlex 2045 is believed to have a density of about 0.920 gm/cm$^3$ and a flow rate (measured by condition E) of from about 0.7 to 1.2 gm/10 min.

Returning to FIG. 1, and in particular, adjacent intermediate layers 2 and 3 it has been determined that a preferred intermediate layer formulation should comprise a very low density polyethylene material having a density less than 0.900 grams per cubic centimeter. A preferred very low density polyethylene is DEFD 1120 available from Dow. Other very low density polyethylene materials or blends of two or more very low density polyethylene materials may be utilized to form the intermediate layers 2 and 3. Preferably the composition of intermediate layers 2 and 3 is the same, however, different very low density polyethylenes or blends thereof may be utilized for each intermediate layer.

With regard to skin layers 4 and 5 it has been determined that a preferred skin layer formulation comprises a copolymer of ethylene and vinyl acetate. The ethylene vinyl acetate copolymer utilized to form the core layer 1 may, preferably, be the same material as that which is utilized to form the two skin or surface layers 4 and 5. Other ethylene vinyl acetate copolymers or blends of two or more ethylene vinyl acetate copolymers may be utilized to form skin layers 4 and 5. Preferably the composition of skin layers 4 and 5 is the same, however, different ethylene vinyl acetate copolymers or blends thereof may be utilized or each skin layer.

Those skilled in the art will readily recognize that all of the above disclosed, by weight, percentages are subject to slight variation. Additionally, these percentages may vary slightly as a result of the inclusion or application of additives such as the silicone mist discussed above or agents such as slip and antiblock agents. A preferred antiblock agent is silica which is available from JohnsManville under the tradename White Mist. Preferred slip agents are Erucamide (available from Humko Chemical under the tradename Kenamide E), and Stearamide (available from the Humko Chemical Company under the tradename Kemamide S) and N, N-' Dioleoylethylenediamine (available from Glyco Chemical under the tradename Acrawax C). A preferred silicone spray is a liquid polyorganosiloxane manufactured by General Electric under the trade designation General Electric SF18 polydimethylsiloxane.

The general ranges for inclusion or, in the case of the silicone spray, the application of these additives are as follows:

| | |
|---|---|
| (1) Silica: | 250–3000 ppm |
| (2) Acrawax C: | 200–4000 ppm |
| (3) Erucamide: | 200–5000 ppm |
| (4) Stearamide: | 200–5000 ppm |
| (5) Silicone Spray: | 0.5 mg. ft$^2$-and up |

When utilized within the specification and claims of the present application the term "consisting essentially of" is not meant to exclude slight percentage variations or additives and agents of this sort.

Additional layers and/or minor amounts of additives of the types described above may be added to the film structure of the present invention as desired but care mut be taken not to adversely affect the desirable physical properties and other characteristics of the inventive film.

In the preferred process for making the multilayer film of the present invention the basic steps are coextruding the layers to form a multilayer film, irradiating the film, and then stretching the film to biaxially orient. These steps and additional desirable steps will be explained in detail in the paragraphs which follow.

The process begins by blending, if necessary, the raw materials (i.e. polymeric resins) in the proportions and ranges desired as discussed above. The resins are usually purchased from a supplier in pellet form and can be blended in any one of a number of commercially available blenders as is well known in the art. During the blending process any additives and/or agents which are desired to be utilized are also incorporated.

The resins and applicable additives and/or agents are then fed to the hoppers of extruders which feed a coextrusion die. For the preferred five-layer film having two identical surface layers and two identical intermediate layers at least 3 extruders need to be employed: one for the two skin or surface layers, one for the two intermediate layers and one for the core layer. Additional extruders may be employed if a film having non-identical surface layers or non-identical intermediate layers is desired. The materials are coextruded as a relatively thick tube or "tape" which has an initial diameter dependent upon the diameter of the coextrusion die. The final diameter of the tubular film is dependent upon the racking ratio, e.g. the stretching ratio. Circular coextrusion dies are well known to those in the art and can be purchased from a number of manufacturers. In addition to tubular coextrusion, slot dies could be used to coextrude the material in sheet form. Well known single or multilayer extrusion coating processes could also be utilized, if desired.

An additional process step which should be utilized to manufacture the preferred embodiment of the presently inventive film is to irradiate the tape or unexpanded tubing or sheet by bombarding it with high-energy electrons from an accelerator to cross-link the materials of the tube. Crosslinking greatly increases the structural strength of the film or the force at which the material can be stretched before tearing apart when the film materials are predominately ethylene such as polyethylene or ethylene vinyl acetate copolymer. Irradiation also improves the optical properties of the film and changes the properties of the film at higher temperatures. A preferred irradiation dosage level is in the range of from about 0.5 MR to about 12.0 MR. An even more preferred range is from about 4 MR to about 8 MR. The most preferred dosage level is approximately 5 MR.

Following coextrusion, quenching to cool and solidify, and irradiation of the tape the extruded tape is reheated and inflated, by application of internal air pressure, into a bubble thereby transforming the narrow tape with thick walls into a wide film with thin walls of the desired film thickness and width. This process is sometimes referred to as the "trapped bubble technique" of orientation or as "racking". The degree of inflation and subsequent stretching is often referred to as the "racking ratio" or "stretching ratio". For example, a transverse racking or stretching ratio of 2.0 would mean that the film had been stretched 2.0 times its original extruded size in the transverse direction during transverse racking. After stretching, the tubular film is then collapsed into a superimposed lay-flat configuration and wound into rolls often referred to as "mill rolls". The racking process orients the film by stretching it transversely and, to some extent, longitudinally and thus imparts shrink capabilities to the film. Additional longitudinal or machine direction racking or stetching may be accomplished by revolving the deflate rollers which aid in the collapsing of the "blown bubble" at a greater speed than that of the rollers which serve to transport the reheated "tape" to the racking or blown bubble area. Preferred transverse and longitudinal stretching ratios of the present film range from about 2.5 transverse by about 3.0 longitudinal to about 5.0 transverse and about 5.0 longitudinal. A particularly preferred stretching ratio is about 3.5 transverse by about 3.5 longitudinal. All of these methods of orientation are well known to those of skill in the art.

To further disclose and clarify the scope of the present invention to those skilled in the art the following examples are presented.

EXAMPLE 1

An embodiment of the present invention was formed by coextrusion, irradiated and stretched (oriented) by application of internal air (bubble technique) in accordance with the teachings described above. Example 1 was a five layered film irradiated with approximately 5 MR and had an approximate layer thickness ratio of 1/1.5/1/1.5/1. This film comprised a layer structure of "A/B/A/B/A". A represents an ethylene vinyl acetate copolymer have about 9% vinyl acetate derived units (Escorene LD 318.92); and B represents a very low density polyethylene having a density of about 0.890 gm/cm$^3$ (DEFD 1120).

Both the EVA and VLDPE were pre-blended with 1% antifog additives.

EXAMPLE 2

A film like that of Example 1 was made, but with an EVA with 3.6% vinyl acetate content by weight (PE 204 CS 95 from El Paso) instead of the LD 318.92.

Both the EVA and VLDPE were pre-blended with 1.5% antifog additives.

The advantages of the present invention are demonstrated by Table 1, which compares the elongation, shrink, and oxygen transmission properties of the film of the present invention (Film F) with other stretch/shrink film (Films A-E).

The films A-F of Table 1 had the following structures:

| Film A | $EVA_1/LLDPE_1/EVA_1/LLDPE_1/EVA_1$ | |
|---|---|---|
| Film B | $EVA_2/LLDPE_2/EVA_2/LLDPE_2/EVA_2$ | |
| Film C | $EVA_2/LLDPE_2/EVA_2/LLDPE_2/EVA_1$ + 2000 ppm Slip Agent$_1$ | |
| Film D | $EVA_2/LLDPE_2/EVA_2/LLDPE_2/EVA_2$ + 3000 ppm Slip Agent$^1$ | |
| File E | $EVA_2/LLDPE_2/EVA_2/LLDPE_2/EVA_2$ + 3000 ppm Slip Agent$_1$ (Wet Blend) | |
| Film F | $EVA_2/VLDPE_1/EVA_2/VLDPE_1/EVA_2$ | |
| where: | | |
| $EVA_1$ | = PE 204 CS95 (3.6 vinyl acetate) (2.0 melt index) | El Paso |
| $EVA_2$ | = LD 318.92 (9% vinyl acetate) (2.0 melt index) | Exxon |
| $LLDPE_1$ | = 61502.25 (density = .920) | Dow |
| $LLDPE_2$ | = LPX 92 (density = .918) | Exxon |
| Slip Agent$_1$ | = Acrawax C | Glyco |
| $VLDPE_1$ | = DEFD 1120 (density = 0.890 gms/cc) | Dow |

TABLE 1

| | A | B | C | D | E | F |
|---|---|---|---|---|---|---|
| Layer Thickness Ratio | 1/1.5/1/1.5/1 | 1/1.5/1/1.5/1 | 1/1.5/1/1.5/1 | 1/1.5/1/1.5/1 | 1/1.5/1/1.5/1 | 1/1.5/1/1.5/1 |
| Elongation At Break And 73%° F. (%)[1] | | | | | | |
| Av.[2] Long. | 192. (0.75) | 166. (0.76) | 152. (0.72) | 107. (0.59) | 171. (0.66) | 153. (0.76) |
| Std. Dev. | 5. (0.01) | 3. (0.04) | 7. (0.04) | 18. (0.04) | 14. (0.02) | 3. (0.02) |
| 95% C.L.[3] | 9. (0.02) | 5. (0.06) | 11. (0.06) | 29. (0.07) | 23. (0.03) | 5. (0.03) |
| Av. Trans. | 175. (0.63) | 185. (0.71) | 196. (0.76) | 162. (0.48) | 124. (0.62) | 261. (0.80) |
| Std. Dev. | 18. (0.03) | 9. (0.02) | 4. (0.02) | 20. (0.04) | 60. (0.03) | 15. (0.01) |
| 95% C.L. | 29. (0.05) | 15. (0.03) | 6. (0.03) | 32. (0.07) | 95. (0.05) | 23. (0.02) |
| Shrink Properties At 150° F. | | | | | | |

TABLE 1-continued

| | A | B | C | D | E | F |
|---|---|---|---|---|---|---|
| Free Shrink (%)[4] | | | | | | |
| Av. Long. | 11. | 10. | 11. | 10. | 10. | 11. |
| Std. Dev. | 1. | 1. | 1. | 1. | 1. | 1. |
| 95% C.L. | 1. | 1. | 1. | 1. | 1. | 1. |
| Av. Trans. | 9. | 6. | 10. | 7. | 8. | 14. |
| Std. Dev. | 1. | 1. | 1. | 1. | 1. | 2. |
| 95% C.L. | 2. | 1. | 2. | 1. | 1. | 3. |
| Shrink Force (lbs.)[5] | | | | | | |
| Av. Long. | 0.198 | 0.195 | 0.213 | 0.203 | 0.163 | 0.133 |
| | (0.69) | (0.77) | (0.78) | (0.62) | (0.66) | (0.74) |
| Std. Dev. | 0.005 | 0.010 | 0.022 | 0.005 | 0.005 | 0.015 |
| | (0.06) | (0.02) | (0.02) | (0.03) | (0.01) | (0.05) |
| 95% C.L. | 0.008 | 0.016 | 0.035 | 0.008 | 0.008 | 0.024 |
| | (0.10) | (0.04) | (0.03) | (0.05) | (0.02) | (0.09) |
| Av. Trans. | 0.220 | 0.119 | 0.180 | 0.095 | 0.170 | 0.150 |
| | (0.76) | (0.77) | (0.82) | (0.54) | (0.69) | (0.77) |
| Std. Dev. | 0.000 | 0.013 | 0.016 | 0.010 | 0.012 | 0.008 |
| | (0.01) | (0.03) | (0.03) | (0.00) | (0.01) | (0.02) |
| 95% C.L. | 0.000 | 0.021 | 0.026 | 0.016 | 0.018 | 0.013 |
| | (0.02) | (0.04) | (0.04) | (0.01) | (0.02) | (0.03) |
| Shrink Tension (PSI)[6] | | | | | | |
| Av. Long. | 290. | 254. | 274. | 327. | 246. | 178. |
| Std. Dev. | 31. | 20. | 24. | 12. | 9. | 7. |
| 95% C.L. | 50. | 33. | 38. | 19. | 15. | 12. |
| Av. Trans. | 291. | 154. | 220. | 176. | 246. | 194. |
| Std. Dev. | 5. | 15. | 17. | 18. | 16. | 12. |
| 95% C.L. | 8. | 25. | 27. | 28. | 26. | 18. |
| Shrink Properties at 160° F. | | | | | | |
| Free Shrink (%)[4] | | | | | | |
| Av. Long. | 14. | 13. | 14. | 11. | 12. | 15. |
| Std. Dev. | 1. | 1. | 1. | 1. | 1. | 1. |
| 95% C.L. | 2. | 2. | 2. | 2. | 2. | 2. |
| Av. Trans. | 12. | 11. | 12. | 10. | 13. | 21. |
| Std. Dev. | 1. | 1. | 1. | 1. | 1. | 0. |
| 95% C.L. | 2. | 2. | 1. | 1. | 2. | 0. |
| Shrink Force (lbs.)[5] | | | | | | |
| Av. Long. | 0.198 | 0.213 | 0.230 | 0.193 | 0.190 | 0.166 |
| | (0.70) | (0.74) | (0.73) | (0.59) | (0.69) | (0.78) |
| Std. Dev. | 0.024 | 0.010 | 0.014 | 0.009 | 0.016 | 0.015 |
| | (0.01) | (0.03) | (0.03) | (0.03) | (0.04) | (0.01) |
| 95% C.L. | 0.038 | 0.015 | 0.023 | 0.014 | 0.026 | 0.024 |
| | (0.02) | (0.05) | (0.05) | (0.04) | (0.06) | (0.02) |
| Av. Trans. | 0.155 | 0.188 | 0.189 | 0.124 | 0.174 | 0.175 |
| | (0.64) | (0.73) | (0.78) | (0.63) | (0.65) | (0.82) |
| Std. Dev. | 0.010 | 0.010 | 0.017 | 0.011 | 0.008 | 0.010 |
| | (0.02) | (0.01) | (0.03) | (0.01) | (0.03) | (0.01) |
| 95% C.L. | 0.016 | 0.015 | 0.026 | 0.018 | 0.012 | 0.016 |
| | (0.03) | (0.01) | (0.04) | (0.01) | (0.05) | (0.02) |
| Shrink Tension (PSI)[6] | | | | | | |
| Av. Long. | 281. | 288. | 315. | 327. | 276. | 214. |
| Std. Dev. | 31. | 11. | 13. | 29. | 33. | 17. |
| 95% C.L. | 50. | 17. | 21. | 46. | 52. | 27. |
| Av. Trans. | 243. | 256. | 243. | 196. | 269. | 215. |
| Std. Dev. | 18. | 14. | 18. | 15. | 8. | 12. |
| 95% C.L. | 28. | 23. | 28. | 24. | 12. | 19. |
| Shrink Properties At 175° F. | | | | | | |
| Free Shrink (%)[4] | | | | | | |
| Av. Long. | 21. | 21. | 21. | 17. | 18. | 23. |
| Std. Dev. | 1 | 2. | 1. | 1. | 1. | 2. |
| 95% C.L. | 1. | 3. | 2. | 1. | 2. | 2. |
| Av. Trans. | 22. | 19. | 20. | 17. | 20. | 32. |
| Std. Dev. | 1. | 2. | 2. | 1. | 1. | 1. |
| 95% C.L. | 2. | 3. | 2. | 2. | 2. | 1. |
| Shrink Force (lbs.)[5] | | | | | | |
| Av. Long. | 0.259 | 0.238 | 0.284 | 0.234 | 0.195 | 0.199 |
| | (0.85) | (0.73) | (0.86) | (0.57) | (0.70) | (0.79) |
| Std. Dev. | 0.014 | 0.013 | 0.008 | 0.024 | 0.010 | 0.014 |
| | (0.13) | (0.04) | (0.10) | (0.05) | (0.02) | (0.00) |
| 95% C.L. | 0.023 | 0.020 | 0.012 | 0.038 | 0.016 | 0.023 |
| | (0.21) | (0.06) | (0.16) | (0.08) | (0.03) | (0.01) |
| Av. Trans. | 0.251 | 0.228 | 0.230 | 0.158 | 0.201 | 0.220 |
| | (0.84) | (0.78) | (0.74) | (0.65) | (0.69) | (0.86) |
| Std. Dev. | 0.014 | 0.010 | 0.008 | 0.005 | 0.006 | 0.016 |
| | (0.07) | (0.02) | (0.03) | (0.02) | (0.01) | (0.01) |
| 95% C.L. | 0.023 | 0.015 | 0.013 | 0.008 | 0.010 | 0.026 |
| | (0.11) | (0.04) | (0.05) | (0.04) | (0.02) | (0.02) |
| Shrink Tension (PSI)[6] | | | | | | |
| Av. Long. | 310. | 325. | 331. | 414. | 279. | 250. |

TABLE 1-continued

|  | A | B | C | D | E | F |
|---|---|---|---|---|---|---|
| Std. Dev. | 32. | 8. | 27. | 25. | 11. | 19. |
| 95% C.L. | 51. | 13. | 43. | 39. | 18. | 30. |
| Av. Trans. | 298. | 291. | 311. | 243. | 293. | 255. |
| Std. Dev. | 6. | 15. | 10. | 9. | 9. | 16. |
| 95% C.L. | 10. | 24. | 16. | 14. | 14. | 26. |
| Shrink Properties At 185° F. | | | | | | |
| Free Shrink[4] | | | | | | |
| Av. Long. | 25. | 25. | 25. | 22. | 23. | 34. |
| Std. Dev. | 1. | 1. | 1. | 1. | 2. | 1. |
| 95% C.L. | 1. | 2. | 2. | 1. | 3. | 2. |
| Av. Trans. | 28. | 28. | 27. | 26. | 27. | 43. |
| Std. Dev. | 1. | 1. | 2. | 1. | 2. | 1. |
| 95% C.L. | 1. | 2. | 3. | 1. | 3. | 2. |
| Shrink Force (lbs.)[5] | | | | | | |
| Av. Long. | 0.230 (0.82) | 0.255 (0.73) | 0.268 (0.74) | 0.245 (0.60) | 0.211 (0.69) | 0.191 (0.74) |
| Std. Dev. | 0.039 (0.08) | 0.020 (0.01) | 0.010 (0.02) | 0.020 (0.01) | 0.009 (0.02) | 0.012 (0.03) |
| 95% C.L. | 0.062 (0.12) | 0.032 (0.02) | 0.017 (0.03) | 0.032 (0.02) | 0.014 (0.03) | 0.019 (0.07) |
| Av. Trans. | 0.288 (0.86) | 0.215 (0.76) | 0.225 (0.76) | 0.140 (0.55) | 0.219 (0.69) | 0.209 (0.85) |
| Std. Dev. | 0.009 (0.03) | 0.017 (0.02) | 0.006 (0.02) | 0.008 (0.01) | 0.006 (0.01) | 0.010 (0.01) |
| 95% C.L. | 0.014 (0.04) | 0.028 (0.03) | 0.009 (0.04) | 0.013 (0.02) | 0.010 (0.02) | 0.016 (0.02) |
| Shrink Tension (PSI)[6] | | | | | | |
| Av. Long. | 281. | 348. | 362. | 406. | 305. | 259. |
| Std. Dev. | 25. | 28. | 15. | 28. | 5 | 7. |
| 95% C.L. | 39. | 44. | 23. | 45. | 7 | 11. |
| Av. Trans. | 333. | 282. | 297. | 253. | 315. | 246. |
| Std. Dev. | 11. | 22. | 10. | 10. | 6. | 12. |
| 95% C.L. | 18. | 35. | 17. | 17. | 9. | 19. |
| Shrink Properties At 195° F. | | | | | | |
| Free Shrink (%)[4] | | | | | | |
| Av. Long. | 32. | 33. | 34. | 29. | 33. | 50. |
| Std. Dev. | 1. | 2 | 1. | 1. | 1. | 1. |
| 95% C.L. | 2. | 3. | 2. | 2. | 2. | 2. |
| Av. Trans. | 35. | 35. | 34. | 35. | 35. | 54. |
| Std. Dev. | 1. | 4. | 1. | 1. | 2. | 1. |
| 95% C.L. | 2. | 6. | 1. | 2. | 3. | 2. |
| Shrink Force (lbs.)[5] | | | | | | |
| Av. Long. | 0.310 (0.97) | 0.269 (0.76) | 0.280 (0.81) | 0.259 (0.56) | 0.229 (0.70) | 0.230 (0.75) |
| Std. Dev. | 0.026 (0.02) | 0.010 (0.01) | 0.021 (0.03) | 0.025 (0.03) | 0.009 (0.04) | 0.007 (0.02) |
| 95% C.L. | 0.041 (0.04) | 0.016 (0.01) | 0.034 (0.05) | 0.039 (0.04) | 0.014 (0.07) | 0.011 (0.03) |
| Av. Trans. | 0.251 (0.73) | 0.220 (0.71) | 0.246 (0.79) | 0.189 (0.65) | 0.236 (0.65) | 0.204 (0.80) |
| Std. Dev. | 0.006 (0.02) | 0.011 (0.03) | 0.005 (0.05) | 0.010 (0.01) | 0.003 (0.01) | 0.008 (0.03) |
| 95% C.L. | 0.010 (0.03) | 0.017 (0.04) | 0.008 (0.08) | 0.016 (0.01) | 0.004 (0.02) | 0.012 (0.04) |
| Shrink Tension (PSI)[6] | | | | | | |
| Av. Long. | 321. | 352. | 347. | 459. | 328. | 306. |
| Std. Dev. | 32. | 10. | 22. | 35. | 25. | 10. |
| 95% C.L. | 52. | 16. | 36. | 56. | 40. | 16. |
| Av. Trans. | 346. | 311. | 315. | 289. | 364. | 256. |
| Std. Dev. | 12. | 8. | 19. | 18. | 9. | 13. |
| 95% C.L. | 19. | 13. | 30. | 29. | 14. | 21. |
| Shrink Properties At 205° F. | | | | | | |
| Free Shrink[4] | | | | | | |
| Av. Long. | 45. | 42. | 42. | 42. | 40. | 64. |
| Std. Dev. | 1. | 1. | 1. | 1. | 1. | 1. |
| 95% C.L. | 1. | 1. | 1. | 2. | 1. | 1. |
| Av. Trans. | 46. | 42. | 43. | 42. | 45. | 62. |
| Std. Dev. | 1. | 1. | 1. | 2. | 1. | 1. |
| 95% C.L. | 1. | 1. | 1. | 2. | 1. | 1. |
| Shrink Force (lbs.)[5] | | | | | | |
| Av. Long. | 0.258 (0.74) | 0.270 (0.74) | 0.288 (0.83) | 0.273 (0.64) | 0.226 (0.71) | 0.240 (0.72) |
| Std. Dev. | 0.039 (0.13) | 0.014 (0.06) | 0.032 (0.14) | 0.013 (0.01) | 0.014 (0.04) | 0.019 (0.06) |
| 95% C.L. | 0.061 (0.20) | 0.022 (0.09) | 0.051 (0.23) | 0.021 (0.01) | 0.022 (0.06) | 0.030 (0.10) |
| Av. Trans. | 0.251 (0.65) | 0.229 (0.72) | 0.231 (0.75) | 0.159 (0.63) | 0.219 (0.66) | 0.149 (0.72) |

TABLE 1-continued

|  | A | B | C | D | E | F |
|---|---|---|---|---|---|---|
| Std. Dev. | 0.017 | 0.010 | 0.011 | 0.006 | 0.014 | 0.013 |
|  | (0.02) | (0.06) | (0.03) | (0.04) | (0.01) | (0.01) |
| 95% C.L. | 0.026 | 0.016 | 0.018 | 0.010 | 0.023 | 0.021 |
|  | (0.03) | (0.10) | (0.04) | (0.06) | (0.02) | (0.01) |
| Shrink Tension (PSI)[6] | | | | | | |
| Av. Long. | 351. | 368. | 352. | 428. | 319. | 336. |
| Std. Dev. | 21. | 26. | 32. | 22. | 29. | 15. |
| 95% C.L. | 33. | 42. | 52. | 36. | 45. | 24. |
| Av. Trans. | 385. | 321. | 307. | 251. | 332. | 207. |
| Std. Dev. | 15. | 31. | 9. | 12. | 19. | 18. |
| 95% C.L. | 25. | 49. | 15. | 19. | 29. | 28. |
| $O_2$ Transmission | | | | | | |
| @ 73° F. | | | | | | |
| 0% R.H.[7] | | | | | | |
| Sample 1 | 11901.5 | 11001.9 | 10703.8 | 14692.0 | 14262.2 | 19062.6 |
| Sample 2 | 11464.0 | 11484.7 | 10381.2 | 13204.3 | 13116.0 | 18691.6 |
| Sample 3 | 11460.4 | 13304.0 | 10380.8 | 14605.5 | 15141.0 | 17812.0 |
| Gauge | | | | | | |
| Sample 1 | 0.67 | 0.70 | 0.83 | 0.64 | 0.69 | 0.90 |
| Sample 2 | 0.72 | 0.73 | 0.99 | 0.66 | 0.68 | 0.97 |
| Sample 3 | 0.70 | 0.72 | 0.92 | 0.62 | 0.64 | 0.90 |

The following footnotes apply to Table II.
[1] ASTM D882-81
[2] All values in Table II are averages obtained from four (4) replicate measurements.
[3] C.L. is confidence limit - for example, if the reported value was 10 and the 95% C.L. was 2, then if 100 replicate readings were made, 95 of them would have a value between 8 and 12, inclusive.
[4] ASTM D2732-70 (reapproved 1976)
[5] ASTM D2838-81 (shrink force = shrink tension × film thickness in mils × 1000).
[6] ASTM D2838-81
[7] Units of cubic centimeters STP/24 hours, square meter, atmosphere); ASTM D3985. Gauge thicknesses are given in parenthesis.

The above examples and embodiments are given by way of illustration only since various changes and modifications within the spirit and scope of the invention will become apparent to those of ordinary skill in the art upon review of the above detailed description and examples.

In view of the above:

I claim:

1. A multiply film comprising:
   a first interior layer comprising a copolymer of ethylene and vinyl acetate;
   at least one other interior layer comprising a very low density polyethylene having a density below 0.900 grams per cubic centimeter; and
   two surface layers comprising a copolymer of ethylene and vinyl acetate; wherein the film has an oxygen transmission rate of at least about 15000 cc/m$^2$ mil 24 hours at standard temperature and pressure.

2. A five layer film comprising:
   a core layer comprising a copolymer of ethylene and vinyl acetate;
   two intermediate layers each adjacent said core layer, said intermediate layers comprising a very low density polyethylene having a density below 0.900 grams per cubic centimeter; and
   two surface layers comprising a copolymer of ethylene and vinyl acetate; wherein the film has an oxygen transmission rate of at least about 15000 cc/m$^2$ mil 24 hours at standard temperature and pressure.

3. A five layer film comprising:
   a core layer consisting essentially of a copolymer of ethylene and vinyl acetate;
   two intermediate layers each adjacent said core layer, said intermediate layers consisting essentially of a very low density polyethylene having a density below 0.900 grams per cubic centimeter polyethylene; and
   two surface layers consisting essentially of a copolymer of ethylene and vinyl acetate; wherein the film has an oxygen transmission rate of at least about 15000 cc/m$^2$ mil 24 hours at standard temperature and pressure.

4. A film according to claim 1 wherein said first interior layer further comprises a linear low density polyethylene or a low density polyethylene homopolymer.

5. A film according to claim 1 wherein said first interior layer consists essentially of a blend of about 60%, by weight, of an ethylene vinyl acetate copolymer having from about 8.4% to about 9.4%, by weight, ethylene vinyl acetate derived units with about 40%, by weight, of a linear low density polyethylene having a density of about 0.920 grams per cubic centimeter.

6. A film according to claim 1 wherein said first interior layer and both of said surface layers all comprise the same ethylene vinyl acetate copolymer.

7. A film according to claim 1 which substantially does not continuously propagate a tear in the longitudinal direction.

8. A cross-linked film according to claim 1.

9. A film according to claim 2 wherein said core layer further comprises a linear low density polyethylene or a low density polyethylene homopolymer.

10. A film according to claim 2 wherein said core layers consist essentially of a blend of about 60%, by weight, of an ethylene vinyl acetate copolymer having from about 8.4% to about 9.4%, by weight, ethylene vinyl acetate derived units with about 40%, by weight, of a linear low density polyethylene having a density of about 0.920 grams per cubic centimeter.

11. A film according to claim 2 wherein said core layer and said surface layers comprise the same ethylene vinyl acetate copolymer.

12. A film according to claim 8 which has been irradiated with from about 4 MR to 8 MR.

13. A film according to claim 12 which has been irradiated with about 5 MR.

* * * * *